(12) United States Patent
Takeuchi et al.

(10) Patent No.: US 11,938,981 B2
(45) Date of Patent: Mar. 26, 2024

(54) POSITION SPECIFYING DEVICE, POSITION SPECIFYING SYSTEM, POSITION SPECIFYING METHOD, AND COMPUTER READABLE STORAGE MEDIUM

(71) Applicant: Mitsubishi Electric Corporation, Tokyo (JP)

(72) Inventors: Takeshi Takeuchi, Tokyo (JP); Shogo Tatsumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 516 days.

(21) Appl. No.: 17/272,723

(22) PCT Filed: Sep. 7, 2018

(86) PCT No.: PCT/JP2018/033306
§ 371 (c)(1),
(2) Date: Mar. 2, 2021

(87) PCT Pub. No.: WO2020/049741
PCT Pub. Date: Mar. 12, 2020

(65) Prior Publication Data
US 2021/0339779 A1 Nov. 4, 2021

(51) Int. Cl.
*B61L 15/00* (2006.01)
*G06K 7/10* (2006.01)

(52) U.S. Cl.
CPC ....... *B61L 15/0081* (2013.01); *B61L 15/0072* (2013.01); *G06K 7/10366* (2013.01)

(58) Field of Classification Search
CPC ............ B61L 15/0081; G06K 7/10366; G06Q 10/06; G06Q 50/30
See application file for complete search history.

(56) References Cited

U.S. PATENT DOCUMENTS

2013/0028339 A1   1/2013  Schmidt
2016/0068173 A1*  3/2016  Fuchs ................ G06Q 10/0833
                                              340/994

(Continued)

FOREIGN PATENT DOCUMENTS

JP    2017174359 A    9/2017
WO    2017195408 A1   11/2017

OTHER PUBLICATIONS

"Transf-ID: Automatic ID and Data Capture for Rail Freight Asset Management" by J. Gonzalez Fernandez et al. IEEE Internet Computing ( vol. 13, Issue: 1, Jan.-Feb. 2009) (Year: 2009).*

(Continued)

*Primary Examiner* — Peter D Nolan
*Assistant Examiner* — Tanya C Sienko
(74) *Attorney, Agent, or Firm* — BUCHANAN INGERSOLL & ROONEY PC

(57) ABSTRACT

Included are: a unit that receives an indicated read range for an identification tag being affixed to one of devices installed in a train and storing an individual information item identifying the device; a unit that obtains a design information item indicating a model number of a device within the indicated read range and an installation position of the device with the model number in vehicles of the train; a unit that obtains a model number information item indicating a relationship between the model number and the individual information item; a reader that reads an individual information item of the device stored in an identification tag; and a unit that ascertains a model number of the device having the individual information item read and associates the installation position with the individual information item of the device having the model number when the device ascertained is present in the read range.

11 Claims, 8 Drawing Sheets

(56) References Cited

U.S. PATENT DOCUMENTS

2018/0022368 A1* 1/2018 Tatsumi ............... B61L 15/009
            701/19
2019/0144021 A1   5/2019 Yoshimoto et al.

OTHER PUBLICATIONS

Office Action dated Jan. 18, 2022, issued in corresponding Indian Patent Application No. 202127007824, 6 pages.
International Search Report (PCT/ISA/210) dated Nov. 6, 2018, by the Japan Patent Office as the International Searching Authority for International Application No. PCT/JP2018/033306.
Written Opinion (PCT/ISA/237) dated Nov. 6, 2018, by the Japan Patent Office as the International Searching Authority for International Application No. PCT/JP2018/033306.

* cited by examiner

| VEHICLE | INSTALLATION POSITION | MODEL NUMBER |
|---|---|---|
| 11, 21 | MOUNTAIN SIDE, A | BRAKE A |
| 11, 21 | MOUNTAIN SIDE, B | VVVF |
| 11, 21 | MOUNTAIN SIDE, C | BRAKE B |
| 11, 21 | SEA SIDE, A | PROTECTIVE DEVICE |
| 11, 21 | SEA SIDE, B | SIV |

| MODEL NUMBER | INDIVIDUAL INFORMATION ITEM |
|---|---|
| BRAKE A | 1000 TO 1300 |
| VVVF | 2000 TO 2200 |
| BRAKE B | 3000 TO 3300 |
| PROTECTIVE DEVICE | 4000 TO 4200 |
| SIV | 5000 TO 5200 |

POSITION SPECIFYING DEVICE, POSITION
SPECIFYING SYSTEM, POSITION
SPECIFYING METHOD, AND COMPUTER
READABLE STORAGE MEDIUM

FIELD

The present invention relates to a position specifying device that specifies positions of devices installed on railroad vehicles and also relates to a position specifying system, a position specifying method, and a position specifying program.

BACKGROUND

Each of vehicles composing a train has a plurality of devices installed at externally visible positions under a floor of a passenger compartment. When there is a failed device, ascertaining what kind of train in what kind of operation has actually used the failed device can be helpful in ascertaining a cause of failure. However, after the devices installed on the vehicle are removed for repair, maintenance, or the like, there are cases where the devices are not returned to the vehicle. There are also cases where the vehicles are relocated relative to one another in a composition of the train, resulting in changes in the composition of the train. Individual information items that identify the devices installed in vehicles are not currently managed. Therefore, ascertaining what kind of train in what kind of operation has used a certain device has not been possible.

In a method for managing positions of devices in a train, an identification tag storing an individual information item is affixed to each of the devices, and a location where the stored individual information item is read from the identification tag is associated with the individual information item. Use of wireless tags such as radio frequency identifiers (RFIDs) as the identification tags generally enables respective information items of the plurality of wireless tags to be read collectively by a wireless tag information reader. According to a technique disclosed by Patent Literature 1, an information reader reads an identification information item from one or more wireless tags each of which is affixed to a corresponding object to be managed, and the identification information item of the object to be managed is associated with information about an identification information reading location when being stored.

CITATION LIST

Patent Literature

Patent Literature 1: Japanese Patent Application Laid-open No. 2017-174359

SUMMARY

Technical Problem

However, when the above conventional technique is used for specifying positions of devices installed in vehicles in a train having a plurality of the vehicles connected, there is a possibility in that when another train is present next to the train targeted for specifying positions of devices, identification information item of a device installed in the adjacent train may be read. In that case, the identification information item of the wrong device is problematically associated with location information. When the identification information item of the device in the immediate train is read, removing the identification information item of the device in the immediate train from read device identification information is necessary to prevent accidental association, and it takes time.

The present invention has been made in view of the above, and an object of the present invention is to obtain a position specifying device that is capable of identifying devices in a target train among a plurality of trains.

Solution to Problem

A position specifying device according to an aspect of the present invention includes: a read target reception unit to receive an indicated read range for an identification tag to be read, the identification tag being affixed to corresponding one of a plurality of devices installed in vehicles of a train and storing an individual information item identifying the corresponding one device; a design information acquisition unit to obtain at least one design information item indicating a model number of one of the plurality of the devices within the indicated read range and an installation position of the one of the plurality of the devices with the model number in the vehicles of the train, the model number indicating a type of each of the devices; a model number information acquisition unit to obtain at least one model number information item indicating a relationship between the model number and the individual information item; a reader to read, from each of one or more identification tags, an individual information item of one of the plurality of the devices stored in the identification tag; and a determination unit to ascertain, by use of the model number information item(s), a model number of at least one of the plurality of the devices having an individual information item read by the reader, determine, by use of the design information item(s), whether or not the at least one of the plurality of the devices having the model number ascertained is present in the indicated read range of the read target reception unit, and associate an installation position indicated by the design information item with the individual information item of the at least one of the plurality of devices having the model number ascertained when the at least one of the plurality of the devices having the model number ascertained is present in the indicated read range.

Advantageous Effect of Invention

The position specifying device according to the present invention is capable of specifying positions of devices in a target train among a plurality of trains.

DESCRIPTION OF EMBODIMENTS

With reference to the drawings, a detailed description is hereinafter provided of position specifying devices, position specifying systems, position specifying methods, and position specifying programs according to embodiments of the present invention. It is to be noted that these embodiments are not restrictive of the present invention.

First Embodiment

Figure 1:
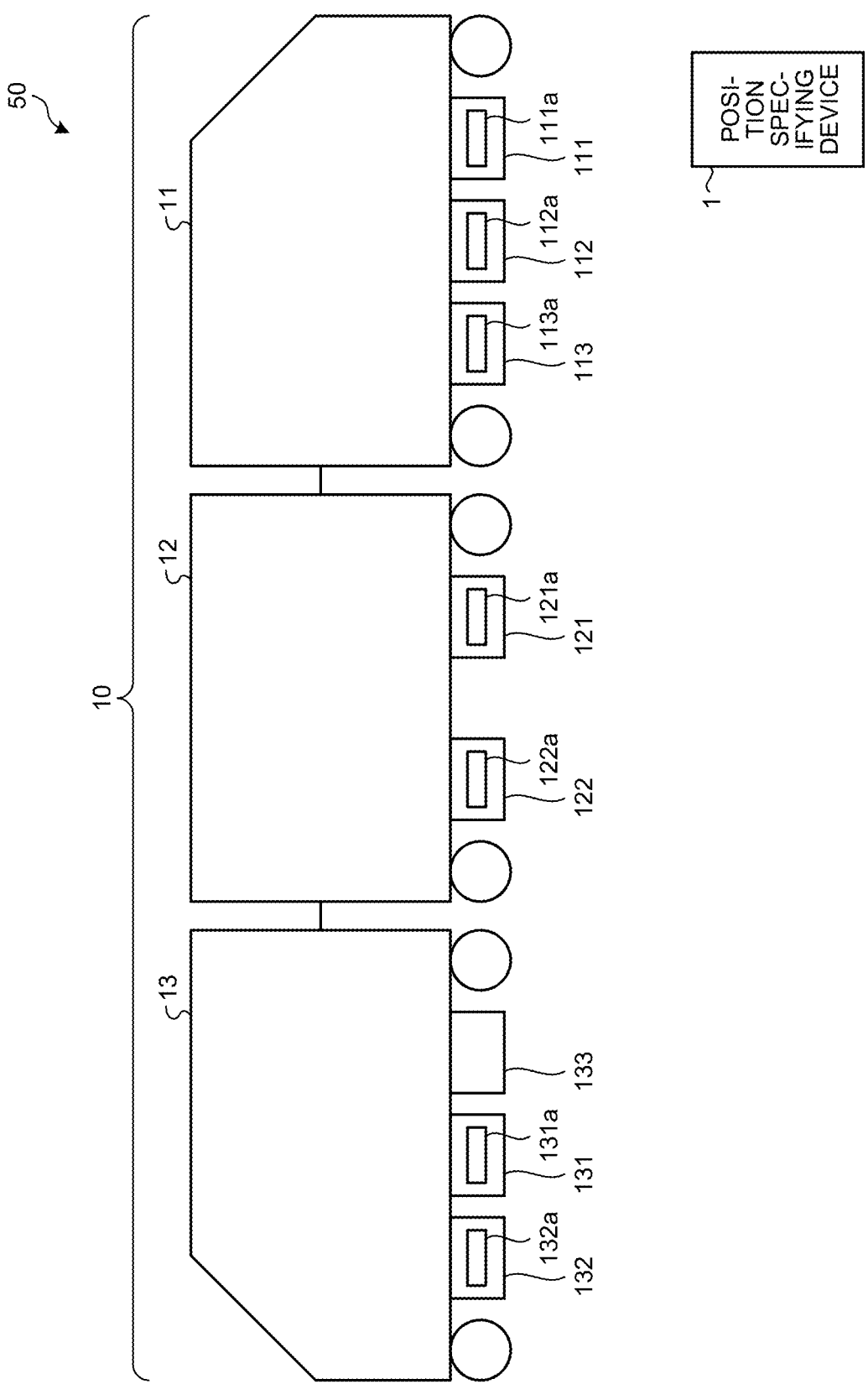
FIG. 1 illustrates a configuration example of a position specifying system according to a first embodiment.
Figure 2:
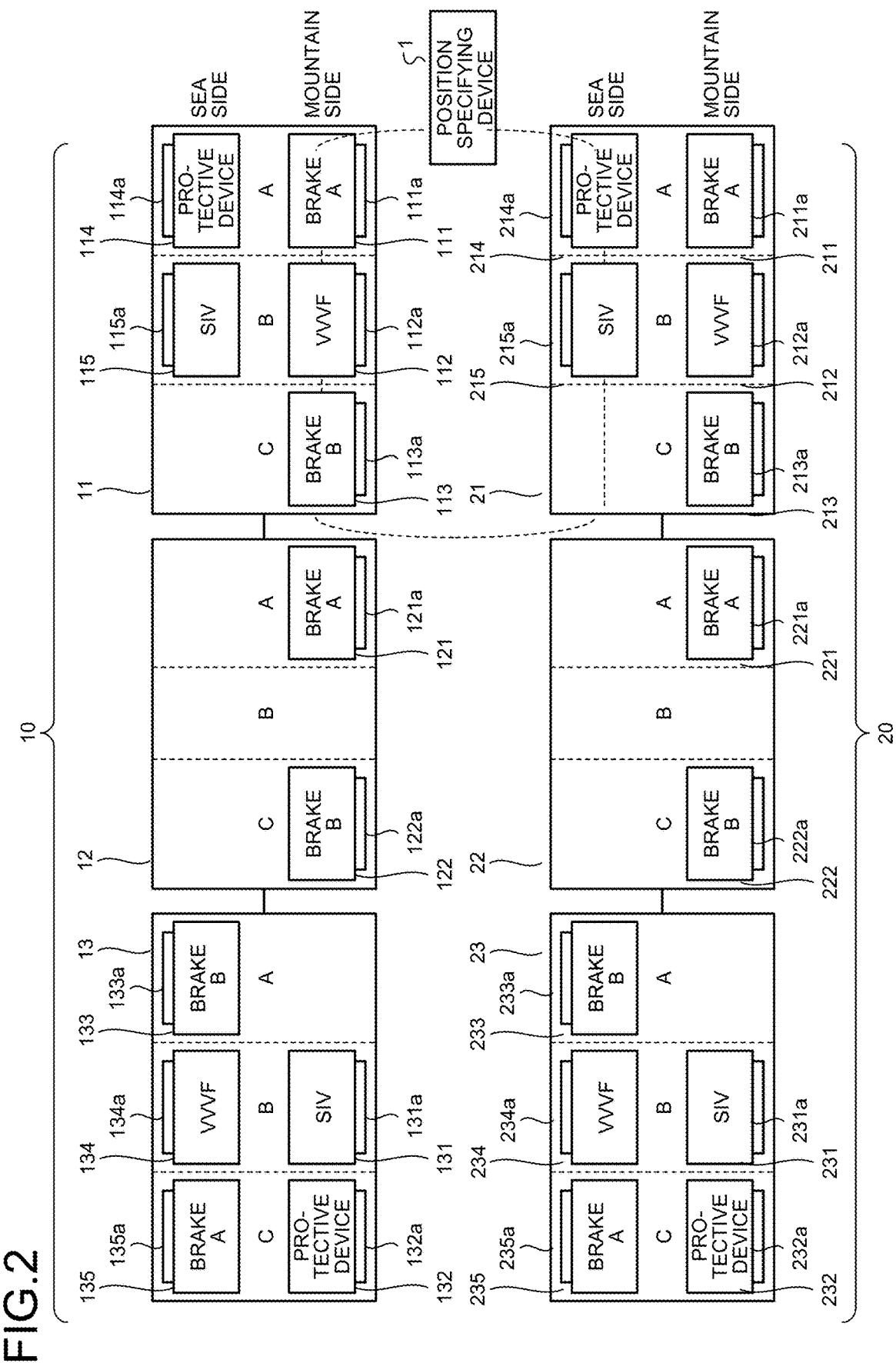
FIG. 2 is an image illustrating how a position specifying device reads individual information items of devices from identification tags each affixed to the device in the position specifying system according to the first embodiment.

FIG. 1 illustrates a configuration example of a position specifying system 50 according to the first embodiment of the present invention. FIG. 2 is an image illustrating how a position specifying device 1 reads individual information items of devices from identification tags each affixed to the device in the position specifying system 50 according to the first embodiment. FIG. 2 illustrates the devices installed on vehicles 11 to 13 of a train 10 and the devices installed on vehicles 21 to 23 of a train 20 in a view looking down at the trains 10 and 20 from which passenger compartments are removed.

The position specifying system 50 includes the identification tags 111a to 115a, 121a, 122a, and 131a to 135a affixed respectively to the devices 111 to 115, 121, 122, and 131 to 135, which are installed under floors of the vehicles 11 to 13 of the train 10. The position specifying system 50 also includes the identification tags 211a to 215a, 221a, 222a, and 231a to 235a affixed respectively to the devices 211 to 215, 221, 222, and 231 to 235, which are installed under floors of the vehicles 21 to 23 of the train 20. In FIG. 2, the devices 111, 121, 135, 211, 221, and 235 are brakes A, the devices 112, 134, 212, and 234 are variable-voltage/ variable-frequency (VVVF) inverters, the devices 113, 122, 133, 213, 222, and 233 are brakes B, the devices 114, 132, 214, and 232 are protective devices, and the devices 115, 131, 215, and 231 are static inverters (SIVs). However, these devices are non-limiting examples. Stored in each of the identification tags 111a to 115a, 121a, 122a, 131a to 135a, 211a to 215a, 221a, 222a, and 231a to 235a is the individual information item identifying the device with the affixed identification tag. The individual information item is, for example, a serial number of the device. When hereinafter described without distinction, the devices 111 to 115, 121, 122, 131 to 135, 211 to 215, 221, 222, and 231 to 235 may be simply referred to as the devices. When hereinafter described without distinction, the identification tags 111a to 115a, 121a, 122a, 131a to 135a, 211a to 215a, 221a, 222a, and 231a to 235a may be simply referred to as the identification tags. The position specifying system 50 also includes the position specifying device 1. The position specifying device 1 emits radio waves toward the affixed identification tags of the devices to read the individual information items from the identification tags.

In the present embodiment, the identification tags are assumed to be wireless tags. The wireless tags are, for example, RFID tags. The position specifying device 1 is capable of reading the individual information items of the devices from a plurality of identification tags at a time by emitting the radio waves over a wide range. It is to be noted that while each of the identification tags illustrated in FIGS. 1 and 2 is large compared with a size of the device, an actual size of the identification tag is small enough compared with the size of the device. The position specifying system 50 ascertains the individual information items of the devices installed under the floors of the vehicles 11 to 13 of the train 10 and associates the devices' individual information items with respective installation positions of the devices on the vehicles 11 to 13 of the train 10. The position specifying system 50 also ascertains the individual information items of the devices installed under the floors of the vehicles 21 to 23 of the train 20 and associates the devices' individual information items with respective installation positions of the devices on the vehicles 21 to 23 of the train 20. An example that is described in the present embodiment is such that the position specifying system 50 ascertains the individual information items of the devices installed under the floors of the vehicles 11 to 13 of the train 10 and associates the devices' individual information items with the installation positions of the devices on the vehicles 11 to 13 of the train 10.

Figures 3, 4:
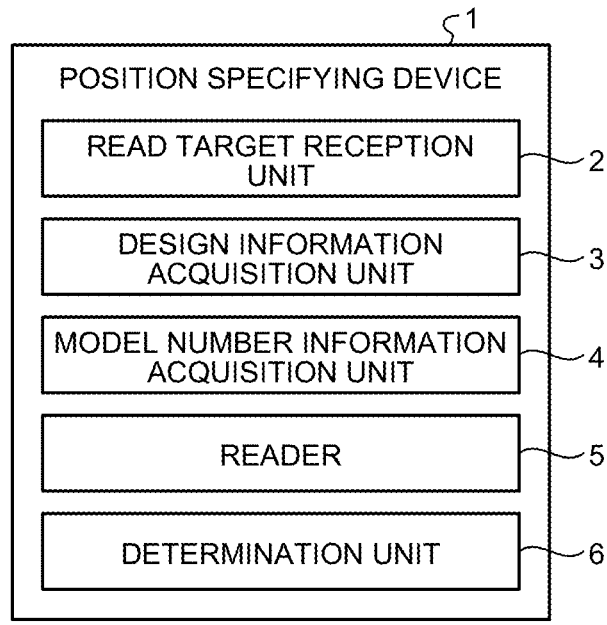
FIG. 3 is a block diagram illustrating a configuration example of the position specifying device according to the first embodiment.
FIG. 4 illustrates examples of a design information item that a design information acquisition unit according to the first embodiment obtains.

A description is provided of a configuration of the position specifying device 1. FIG. 3 is a block diagram illustrating a configuration example of the position specifying device 1 according to the first embodiment. The position specifying device 1 includes a read target reception unit 2, a design information acquisition unit 3, a model number information acquisition unit 4, a reader 5, and a determination unit 6.

The read target reception unit 2 receives an indication of a read range from a user. The indicated read range includes the affixed identification tags from which the stored individual information items identifying the devices installed under the floors of the vehicle 11, 12, or 13 of the train 10 are to be read. The user indicates the read range to the read target reception unit 2 by indicating the train, a left or right side of the train and the vehicle of the train, thus targeting the identification tags from which the individual information items of the devices are to be read. Specifically, the user indicates the train by indicating a train composition number that identifies the train. In the example of FIG. 2, the user indicates the train 10. The user indicates the left or right side of the train by indicating either of a sea and a mountain side that represent the left and right sides. In the example of FIG. 2, the user indicates the mountain side. In a typical method, the sea and mountain sides based on, for example, a traveling direction of the train are used to represent the left side and the right side of the train. However, another method may be used to identify the left and right sides of the train. The user indicates the vehicle by indicating a car number that identifies the vehicle. In the example of FIG. 2, the user indicates the vehicle 11. The position specifying device 1 is carried by the user when the user changes or shifts a reading location where the position specifying device 1 is to read the individual information items of the devices from the identification tags. The present embodiment is based on the assumption that the user carries the position specifying device 1. By carrying the position specifying device 1 to move the position specifying device 1, the user changes the reading location and allows the position specifying device 1 to emit radio waves toward the identification tags for reading the individual information items. The reading location is where the position specifying device 1, namely, the reader 5 emits radio waves toward the identification tags. Content to be indicated to the read target reception unit 2 is changed each time the user changes the reading location, namely, the read range. When the vehicles 11, 12, and 13 are car Nos. 1, 2, and 3, respectively, the user may simplify the vehicle indicating process by indicating the car number of the vehicle from which the reading starts, namely, the car No. 1 or 3 so that the car Nos. 1, 2, and 3 or the car Nos. 3, 2, and 1 are targeted for reading in this order. An input interface such as a touch panel that is not illustrated is used when the read target reception unit 2 receives the read range indicated from the user.

The design information acquisition unit 3 obtains design information items. Each of the design information items indicates a model number of the device within the read range received by the read target reception unit 2, and the installation position of the device with the model number in a vehicle of the train. The model number indicates a type of the device. Specifically, the design information acquisition unit 3 obtains, from among the design information items each indicating the installation position of the device with the model number in a vehicle of the train, those design information items that are relevant to the read range. FIG. 4 illustrates examples of the design information item that the design information acquisition unit 3 according to the first embodiment obtains. The design information items illustrated in FIG. 4 indicate that the vehicle 11 of the train 10 and the vehicle 21 of the train 20 each have the brake A installed on the mountain side of a place A, the VVVF drive installed on the mountain side of a place B, the brake B installed on the mountain side of a place C, the protective device installed on the sea side of the place A, and the SIV installed on the sea side of the place B. The design information items illustrated in FIG. 4 are the examples. The design information items concerning the vehicles 12, 13, 22, and 23 are also obtained by the design information acquisition unit 3. The design information acquisition unit 3 obtains, from among the design information items illustrated in FIG. 4, the design information items relevant to the read range, namely, the design information items about the brake A, the VVVF drive, and the brake B on the mountain side of the vehicle 11 of the train 10. The design information acquisition unit 3 obtains, via communication or a storage medium, the design information items to store from a server (not illustrated) storing the design information items.

Figures 5, 6:
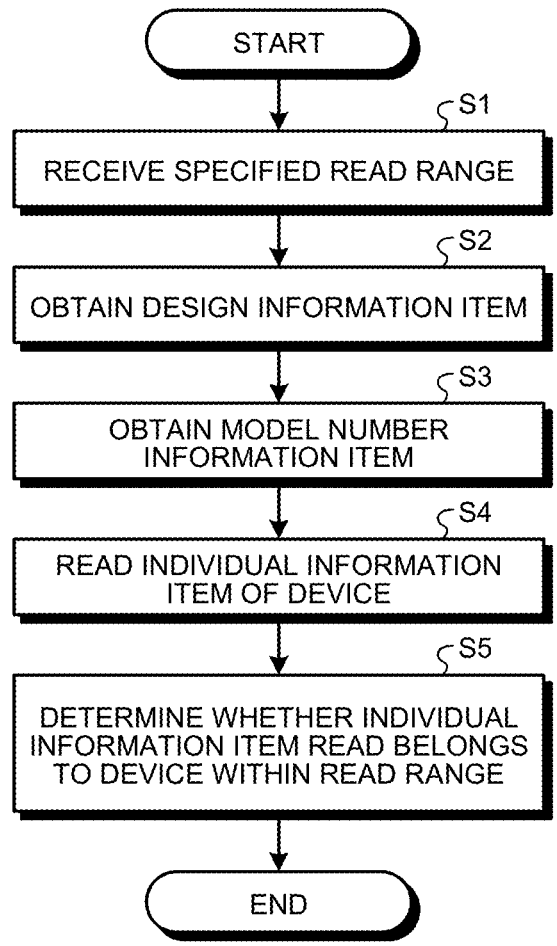
FIG. 5 illustrates examples of a model number information item that a model number information acquisition unit according to the first embodiment obtains.
FIG. 6 is a flowchart illustrating how the position specifying device according to the first embodiment operates when associating respective installation positions of the devices with the individual information items.

The model number information acquisition unit 4 obtains model number information items each indicating a relationship between the model number indicating the type of the device and the individual information item of the device. When the individual information item of each device is the device's serial number that includes information about the device's type, namely, about the device's model number, use of the individual information item read from the identification tag affixed to the device enables the device's model number to be found. FIG. 5 illustrates examples of the model number information item that the model number information acquisition unit 4 according to the first embodiment obtains. The model number information items in FIG. 5 indicate that the device with the individual information item, namely, the serial number in a range of from 1000 to 1300 has the model number BRAKE A, that the device with the individual information item, namely, the serial number in a range of from 2000 to 2200 has the model number VVVF, that the device with the individual information item, namely, the serial number in a range of from 3000 to 3300 has the model number BRAKE B, that the device with the individual information item, namely, the serial number in a range of from 4000 to 4200 has the model number PROTECTIVE DEVICE and that the device with the individual information item, namely, the serial number in a range of from 5000 to 5200 has the model number SIV. When, for example, the individual information item, namely, the serial number read by the reader 5 is "1104", the model number information item to be used tells that the device with the individual information item, namely, the serial number "1104" has the model number BRAKE A. On the basis of the design information items obtained by the design information acquisition unit 3, the model number information acquisition unit 4 at least obtains, from among the model number information items illustrated in FIG. 5, the model number information items about the devices within the read range, namely, the model number information items about the brake A, the VVVF drive, and the brake B. It is to be noted that the model number information acquisition unit 4 may obtain all the model number information items illustrated in FIG. 5. The model number information acquisition unit 4 obtains, via communication or a storage medium, the model number information items to store from the server (not illustrated) storing the model number information items.

The reader 5 reads, from one or more of the identification tags, the individual information items of the corresponding devices stored in the identification tags affixed to the devices. By emitting radio waves toward its surroundings, the reader 5 reads the individual information items of devices that allow their respective individual information items to be read regardless of whether it is the train 10 or the train 20. The reader 5 may store the read individual information items in itself or in a storage unit that is not illustrated.

Using the model number information items obtained by the model number information acquisition unit 4, the determination unit 6 ascertains the model number of each device having the individual information item read by the reader 5. Using the design information items obtained by the design information acquisition unit 3, the determination unit 6 determines whether or not the devices each having the model number ascertained are present in the indicated read range of the read target reception unit 2. For each of the devices that are present in the indicated read range of the read target reception unit 2, the determination unit 6 associates the installation position indicated by the design information item with the individual information item of the device having the model number ascertained.

In the present embodiment, the position specifying device 1 is configured to be portable by the user and is assumed to perform all the processes. However, this is not limiting. For example, the position specifying device 1 may include a reading device that is constituted by the read target reception unit 2 and the reader 5, and an operational device that is constituted by the design information acquisition unit 3, the model number information acquisition unit 4, and the determination unit 6. The reading device shares the individual information items with the operational device by transmitting the individual information items via communication or passing the individual information items via a storage medium.

A description is provided next of how the position specifying device 1 reads the individual information items of the devices from the identification tags, ascertains which individual-information-item carrying device is in which installation position of the vehicle 11, 12, or 13 of the train 10 and associates each of the devices' installation positions with the individual information item. FIG. 6 is a flowchart illustrating how the position specifying device 1 according to the first embodiment operates when associating the installation position of each of the devices with the individual information item. The description provided here is of the example in which the position specifying device 1 receives the user-indicated read range indicating the mountain side of the vehicle 11 of the train 10.

As stated earlier, the user indicates the read range to the read target reception unit 2 by indicating the train 10, the mountain side, and the vehicle 11. The read target reception unit 2 of the position specifying device 1 receives the indicated read range from the user (step S1).

With the received read range of the read target reception unit 2 targeted, the design information acquisition unit 3 obtains the design information items (step S2). Specifically, the design information acquisition unit 3 obtains the design information items relevant to the read range received by the read target reception unit 2, namely, the design information items indicating that the vehicle 11 of the train 10 has the brake A installed as the device 111 on the mountain side of the place A, the VVVF drive installed as the device 112 on the mountain side of the place B, and the brake B installed as the device 113 on the mountain side of the place C.

The model number information acquisition unit 4 obtains the model number information items each indicating the relationship between the model number and the individual information item (step S3). Specifically, using the design information items obtained by the design information acquisition unit 3, the model number information acquisition unit 4 at least obtains, from among the model number information items illustrated in FIG. 5, the model number information item about the model number BRAKE A, the model number information item about the model number VVVF, and the model number information item about the model number BRAKE B.

The reader 5 emits radio waves toward its surroundings to read the individual information items of the devices from the identification tags affixed to the devices (step S4). As described earlier, the reader 5 is capable of reading, from one or more identification tags, the individual information items of the devices stored in the identification tags affixed to the devices. When the position specifying device 1 is present at a reading location illustrated in FIG. 2 for reading the individual information items of the devices, the reader 5 reads, from the identification tags affixed to the devices within an area surrounded by a dotted line, the individual information items of these devices. In other words, the reader 5 reads the individual information items of the devices 111 to 113 from the identification tags 111a to 113a affixed to the respective devices 111 to 113 within the read range, which has been received by the read target reception unit 2. The reader 5 also reads the individual information items of the devices 214 and 215 from the identification tags 214a and 215a affixed to the respective devices 214 and 215, which are installed on the sea side of the vehicle 21 of the immediate train 20, although the devices 214 and 215 are outside the read range received by the read target reception unit 2.

Figure 7:
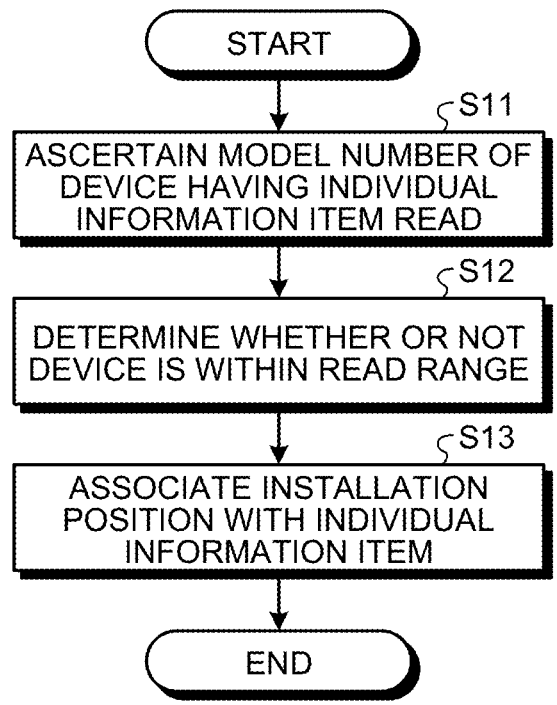
FIG. 7 is a flowchart illustrating how a determination unit according to the first embodiment operates for determining whether or not individual information items read by a reader belong to devices within a read range.

The determination unit 6 determines whether or not the individual information items read by the reader 5 belong to the devices within the indicated read range of the read target reception unit 2 (step S5). A detailed description is provided of how the determination unit 6 operates. FIG. 7 is a flowchart illustrating how the determination unit 6 according to the first embodiment operates for determining whether or not the individual information items read by the reader 5 belong to the devices within the read range.

Using the model number information items, the determination unit 6 ascertains the model number of each device having the individual information item read by the reader 5 (step S11). For example, when the individual information items read by the reader 5 include "1204", "2081", "3219", "4077", and "5063", the determination unit 6 uses the model number information items and determines that the device with the individual information item "1204" has the model number BRAKE A, that the device with the individual information item "2081" has the model number VVVF and that the device with the individual information item "3219" has the model number BRAKE B. When the model number information acquisition unit 4 has obtained only the model number information items about the devices within the read range, namely, the model number information items about the brake A, the VVVF drive, and the brake B, the determination unit 6 is unable to identify the device with the individual information item "4077" and the device with the individual information item "5063". However, because the device with the individual information item "4077" and the device with the individual information item "5063" are outside the read range, the determination unit 6 does not have to ascertain the model number of the device with the individual information item "4077" and the model number of the device with the individual information item "5063". When the model number information acquisition unit 4 has obtained the model number information items about all the model numbers, the determination unit 6 determines that the device with the individual information item "4077" has the model number PROTECTIVE DEVICE and that the device with the individual information item "5063" has the model number SIV.

Using the design information items, the determination unit 6 determines whether or not the devices each having the model number ascertained are present in the indicated range of the read target reception unit 2 (step S12). As described earlier, the devices on the mountain side of the vehicle 11 of the train 10, that is to say, the devices within the read range are the brake A, the VVVF drive, and the brake B. Because the device with the individual information item "1204", the device with the individual information item "2081", and the device with the individual information item "3219" respectively have the model number BRAKE A, the model number VVVF, and the model number BRAKE B, the determination unit 6 determines that these three devices are present in the read range. The determination unit 6 determines that the device with the individual information item "4077" and the device with the individual information item "5063" are not present in the read range.

For each of the devices that are present in the indicated range, the determination unit 6 associates the installation position indicated by the design information item with the individual information item of the device having the model number ascertained (step S13).

Specifically, determining that the brake A with the individual information item "1204" is installed on the mountain side of the place A of the vehicle 11 in the train 10, that the VVVF drive with the individual information item "2081" is installed on the mountain side of the place B of the vehicle 11 in the train 10 and that the brake B with the individual information item "3219" is installed on the mountain side of the place C of the vehicle 11 in the train 10, the determination unit 6 associates these installation positions indicated by the design information items with the individual information items of the devices each having the model number ascertained.

After completing the operation with the mountain side of the vehicle 11 of the train 10, the position specifying device 1 then receives, from the user, a read range indicating the mountain side of the vehicle 12 of the train 10 and performs the same operation as the above.

The position specifying device 1 stores the individual information items associated with the respective installation positions, in the server which is not illustrated. The position specifying device 1 may pass the individual information items associated with the respective installation positions to the server via communication or a storage medium. Thus when there is a failed device, the user is enabled to ascertain what kind of train composition has used the failed device by searching the server for the individual information item of the failed device.

An ordering of the steps in the flowchart of FIG. 6 is given as an example. The position specifying device 1 may have a partial reordering of the steps. For example, the position specifying device 1 may read the individual information items of the devices before obtaining the design information items and the model number information items.

A description is provided next of a hardware configuration of the position specifying device 1. The read target reception unit 2 of the position specifying device 1 is the input interface for receiving operations from the user. The reader 5 is an RFID reader that emits radio waves toward the RFIDs. The design information acquisition unit 3, the model number information acquisition unit 4, and the determination unit 6 are implemented by processing circuitry. The processing circuitry may include a memory and a processor that executes programs stored in the memory or may be dedicated hardware.

Figure 8:
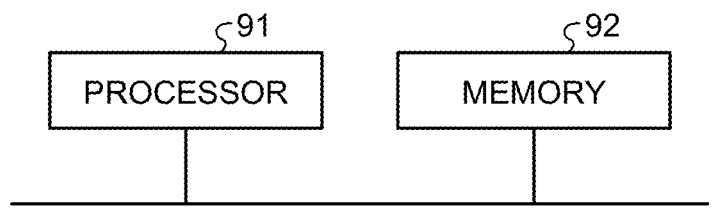
FIG. 8 illustrates an example in which a processing circuitry of the position specifying device according to the first embodiment is configured to include a processor and a memory.

FIG. 8 illustrates an example in which the processing circuitry of the position specifying device 1 according to the first embodiment is configured to include a processor and a memory. When the processing circuitry includes the processor 91 and the memory 92, the processing circuitry of the position specifying device 1 is functionally implemented by software, firmware, or a combination of software and firmware. The software or the firmware is described as programs and is stored in the memory 92. In the processing circuitry, the processor 91 reads and executes the programs stored in the memory 92 for functional implementations. This means that the memory 92 included in the processing circuitry stores the programs, which eventually execute the processes of the position specifying device 1. These programs can be said to cause a computer to execute the steps and the methods of the position specifying device 1.

The processor 91 here may be, for example, a central processing unit (CPU), a processing unit, an arithmetic unit, a microprocessor, a microcomputer, or a digital signal processor (DSP). The memory 92 corresponds to, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark), a magnetic disk, a flexible disk, an optical disk, a compact disk, a mini disk, or a digital versatile disc (DVD).

Figure 9:
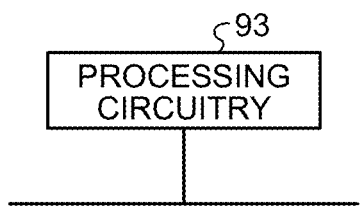
FIG. 9 illustrates an example in which the processing circuitry of the position specifying device according to the first embodiment is configured as dedicated hardware.

FIG. 9 illustrates an example in which the processing circuitry of the position specifying device 1 according to the first embodiment is configured as dedicated hardware. When the processing circuitry is the dedicated hardware, the processing circuitry 93 illustrated in FIG. 9 corresponds to, for example, a single circuit, a composite circuit, a programmed processor, a parallel programmed processor, an application specific integrated circuit (ASIC), a field-programmable gate array (FPGA), or a combination of these. Those functions of the position specifying device 1 may be implemented individually or collectively by the processing circuitry 93.

It is to be noted that some of the functions of the position specifying device 1 may be implemented by dedicated hardware, while some of the other functions may be implemented by software or firmware. By including the dedicated hardware, the software, the firmware or a combination of these, the processing circuitry is capable of the above functional implementations.

As described above, the position specifying device 1 according to the present embodiment ascertains the installation positions of the target train's installed devices within the indicated read range by using the design information items and the model number information items, and associates the installation positions with the individual information items of the devices. Thus the position specifying device 1 is capable of specifying the positions of the installed devices of the target train among the plurality of trains while avoiding associating the installation position with the individual information item of the installed device of the immediate train. The description has been provided of the example in which the devices are installed under the floors of the vehicles; however, this example is not limiting. The position specifying device 1 is also capable of targeting devices installed in other places than under the floors if these devices allow their respective individual information items to be read.

Second Embodiment

The first embodiment has been based on the assumption that the devices' model numbers to be ascertained from the devices' individual information items read by the position specifying device 1 are all different. In the second embodiment, a description is provided of a case where a plurality of devices of the same model number are found when the devices' model numbers are ascertained from the devices' individual information items read by the position specifying device 1. A description is provided of difference from the first embodiment.

Figure 10:
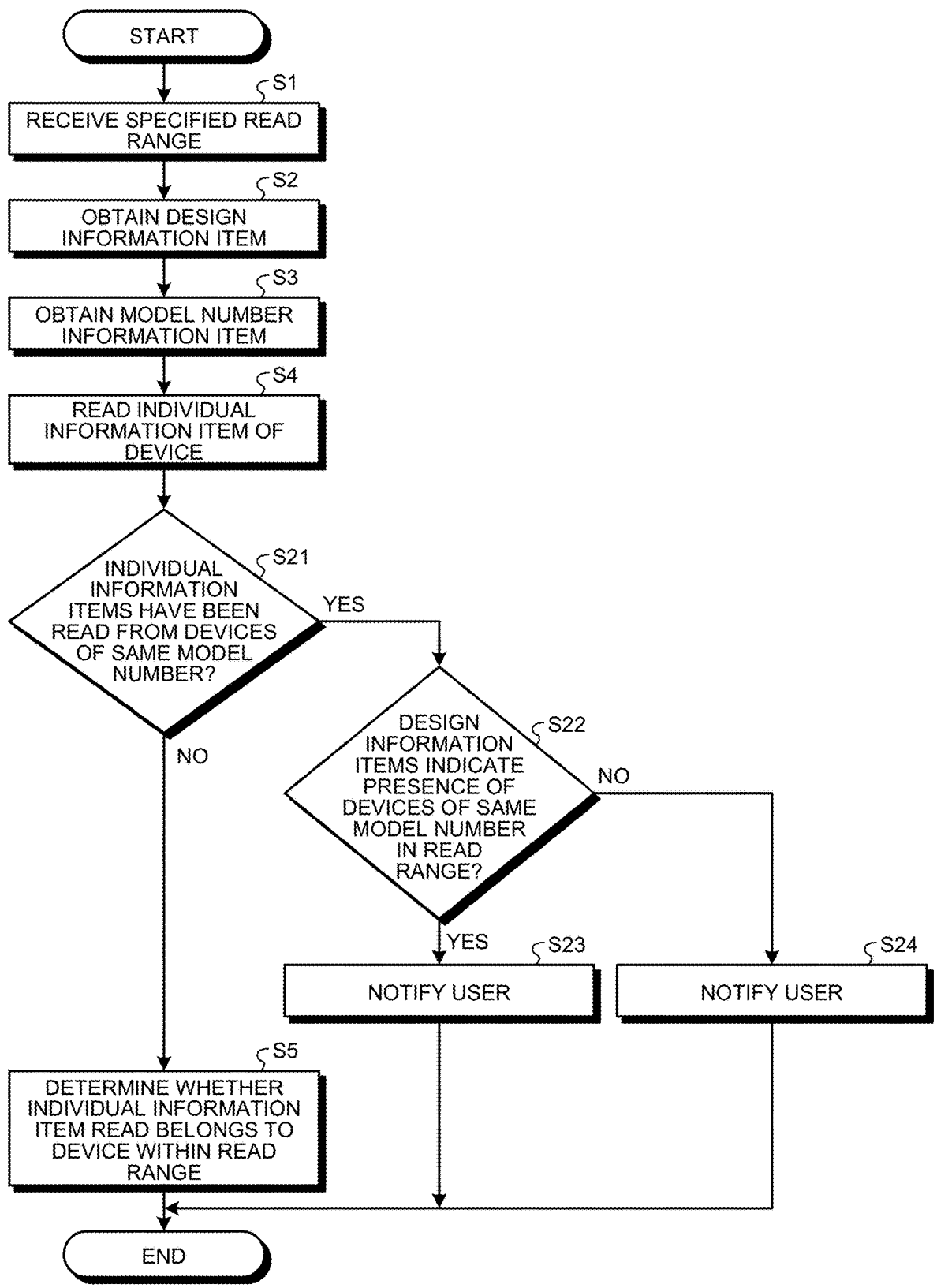
FIG. 10 is a flowchart illustrating how a position specifying device according to a second embodiment operates when associating an installation position of a device with an individual information item.

The position specifying device 1 according to the second embodiment has the same configuration as that of the first embodiment. The position specifying device 1 according to the second embodiment partially differs from that of the first embodiment when operating to associate the installation position of each of the devices with the individual information item. FIG. 10 is a flowchart illustrating how the position specifying device 1 according to the second embodiment operates when associating the installation position of each device with the individual information item. In FIG. 10, the processes indicated by steps S1 to S4 and S5 are the same as those in the first embodiment. In the second embodiment, after the process indicated by step S4, the determination unit 6 determines whether or not the individual information items have been read from the plurality of devices of the same model number (step S21). When the individual information items have been read from no devices of the same model number (No to step S21), the determination unit 6 performs the process indicated by step S5 as in the first embodiment. When the individual information items have been read from the plurality of devices of the same model number (Yes to step S21), the determination unit 6 checks the design information items and determines whether or not the design information items indicate presence of the devices of the same model number in the read range (step S22).

When the design information items indicate the presence of the devices of the same model number in the read range (Yes to step S22), the determination unit 6 notifies a user that the individual information items have been read from the plurality of devices of the same model number and that the design information items indicate the presence of the devices of the same model number in the read range (step S23). After confirming the notification, the user goes near each of the devices indicated in the design information items and uses the position specifying device 1 to make, for example, an adjustment of intensity of radio waves to be emitted, to have each individual information item read individually from the identification tag affixed to the device and to have the installation position associated with the individual information item.

When the design information items indicate no devices of the same model number in the read range (No to step S22), the determination unit 6 notifies the user that the individual information items have been read from the plurality of devices of the same model number and that the design information items indicate no devices of the same model number in the read range (step S24). After confirming the notification, the user goes near each of the devices indicated in the design information items and uses the position specifying device 1 to make, for example, an adjustment of the intensity of radio waves to be emitted, to have the individual information item read from the identification tag affixed to the device and to have the installation position associated with the individual information item.

As described above, the determination unit 6 of the position specifying device 1 according to the present embodiment notifies the user when the individual information items have been read from the plurality of devices of the same model number. Effects thus obtained are the same as those in the first embodiment, and on the basis of the contents of the notification, by manual operation, the user has the individual information item read from the identification tag and has the installation position associated with the individual information item.

Third Embodiment

In the first embodiment, when the train 10 and the train 20 are next to each other, only the train 10 is indicated in the read range. In the third embodiment, these two trains 10 and 20 are indicated in read ranges. A description is provided of difference from the first embodiment.

The position specifying device 1 according to the third embodiment has the same configuration as that of the first embodiment. In the third embodiment, the position specifying device 1 performs the operation illustrated by the flowchart of FIG. 6 for the two trains 10 and 20. The processes that are illustrated by the flowchart of FIG. 6 and are to be performed by the position specifying device 1 for the trains 10 and 20 are the same as those in the first embodiment. In other words, the read target reception unit 2 receives, for each of the plurality of trains, a indicated read range including the identification tags. Using the model number information items, the determination unit 6 ascertains, for each train, the respective model numbers of the devices each having the individual information item read by the reader 5. Using the design information items, the determination unit 6 determines, for each train, whether or not the devices each having the model number ascertained are present in the indicated read range of the read target reception unit 2. For each of the devices that are present in the read ranges, the determination unit 6 associates, for each train, the installation position indicated by the design information item with the individual information item of the device having the model number ascertained.

When the trains 10 and 20 are configured as illustrated in FIG. 2, a user holds the position specifying device 1 and has the individual information items read from the devices while moving from the vehicle 11 toward the vehicle 13. Because the device of the train 10 in the one read range and the device of the train 20 in the one read range do not have the same model number, the position specifying device 1 is capable of reading the individual information items of the devices without reading the individual information items of the plurality of devices of the same model number from the trains 10 and 20. When the train 20 is turned around to an opposite direction in FIG. 2 to have the vehicles 23, 22, and 21 arranged in this order with the train 10 having the vehicles 11, 12, and 13 arranged in this order, the position specifying device 1 reads the individual information items from the plurality of devices of the same model number when reading the individual information items from the devices of the vehicle 12 of the train 10 and the individual information items from the devices of the vehicle 22 of the train 20. Specifically, the position specifying device 1 reads the individual information items from the respective brakes A of the vehicles 12 and 22 of the trains 10 and 20 and reads the individual information items from the respective brakes B of the vehicles 12 and 22 of the trains 10 and 20. In this case, the position specifying device 1 performs the processes described in the second embodiment.

As described above, the position specifying device 1 according to the present embodiment receives the plurality of user-indicated read ranges, ascertains, for each of the read ranges, the installation positions of the installed devices of the target train and associates the installation positions with the devices' individual information items. Thus the position specifying device 1 is capable of efficiently specifying the positions of the devices compared with that of the first embodiment.

Fourth Embodiment

In the first embodiment, the position specifying device 1 obtains only the individual information item from each of the devices installed on the vehicles 11 to 13 of the train 10. A position specifying device according to the fourth embodiment obtains, from each of the devices, a device state information item indicating an operating state of the device. A description is provided of difference from the first embodiment.

Figure 11:
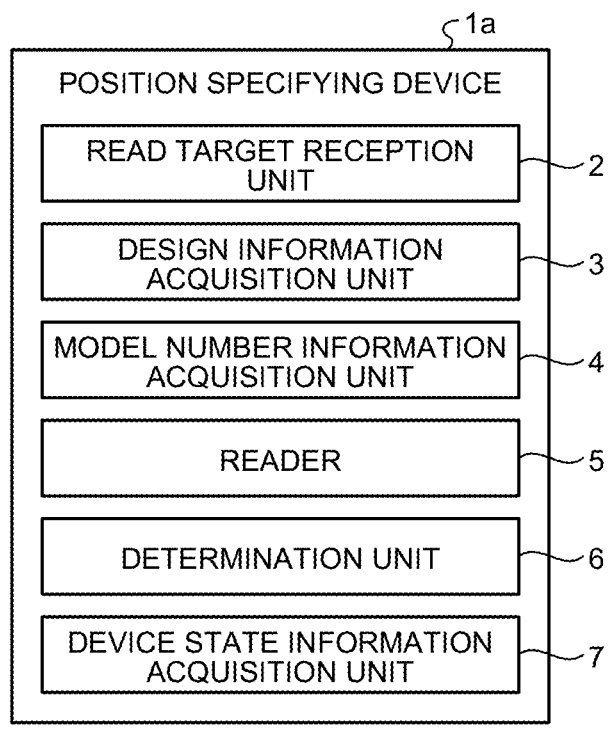
FIG. 11 is a block diagram illustrating a configuration example of a position specifying device according to a fourth embodiment.

FIG. 11 is a block diagram illustrating a configuration example of the position specifying device 1a according to the fourth embodiment. Compared with the FIG. 3 position specifying device 1 according to the first embodiment, the position specifying device 1a additionally includes a device state information acquisition unit 7. The device state information acquisition unit 7 obtains the device state information items from the devices. The device state information acquisition unit 7 stores the device state information items. Each of the device state information items indicates the operating state of the device and enables a varying characteristic of the device to be ascertained. The device state information items are different depending on the devices. The device state information item is, for example, a contact opening/closing count that indicates how many times a relay is switched in the device and can be measured in the form of voltage values, current values, vibration values, pressure values, or any other values with a sensor attached to the device. The individual information item of each of the devices may be associated with the device state information item by the device, the position specifying device, or a server having information transmitted from the position specifying device.

Figure 12:
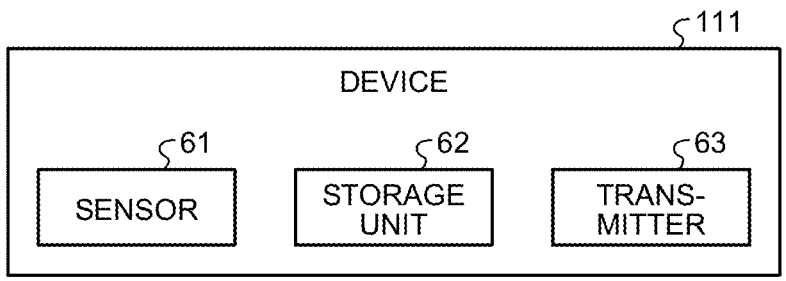
FIG. 12 is a block diagram illustrating a configuration example of a device according to the fourth embodiment.

Using the device 111, which is the brake A, a concrete description is provided of the device that associates the individual information item of the device with the device state information item. FIG. 12 is a block diagram illustrating a configuration example of the device 111 according to the fourth embodiment. The device 111 includes a sensor 61, a storage unit 62, and a transmitter 63. It is to be noted that FIG. 12 illustrates only a functional part that transmits the device state information item, so that a functional part of the device 111 that operates intrinsically as the brake A is omitted. The sensor 61 detects the device state information item indicating the characteristic of the device 111 and stores the detected device state information item in the storage unit 62. The sensor 61 detects, for example, air pressure values that control the operation of the brake A. The device 111 may include a plurality of the sensors 61 for different uses. The storage unit 62 stores the device state information item detected by the sensor 61. When the individual information item has been read from the identification tag 111a by the position specifying device 1a, the transmitter 63, which is a transmitting device, reads the device state information item from the storage unit 62, obtains the individual information item from the identification tag 111a and transmits the device state information item to the position specifying device 1a. Although not illustrated, compared with the position specifying system 50 of FIG. 1, a position specifying system according to the fourth embodiment includes the position specifying device 1a in place of the position specifying device 1 and additionally includes the transmitter 63, which is the transmitting device. With the sensor 61 included in the device 111, the storage unit 62 and the transmitter 63 may be included in another device separate from the device 111. Even in this case, the device state information item detected by the sensor 61 is stored in the storage unit 62.

Figure 13:
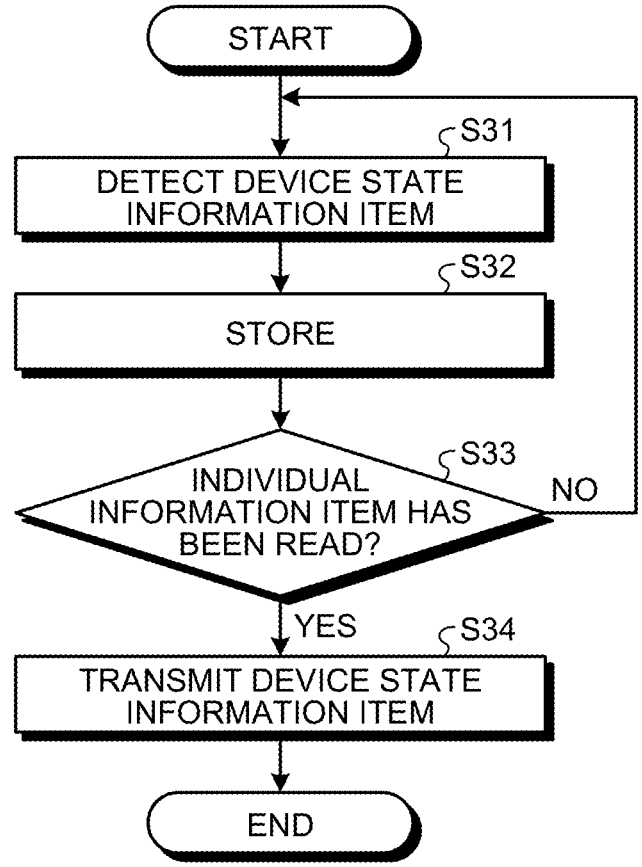
FIG. 13 is a flowchart illustrating how the device according to the fourth embodiment operates when transmitting a device state information item.

FIG. 13 is a flowchart illustrating how the device 111 according to the fourth embodiment operates when transmitting the device state information item. The sensor 61 of the device 111 detects the device state information item (step S31) and stores the detected device state information item in the storage unit 62 (step S32). When the individual information item has not been read from the identification tag 111a yet (No to step S33), assuming that the position specifying device 1a is not near the device 111, the device 111 continues following steps S31 and S32. When the individual information item has been read from the identification tag 111a (Yes to step S33), assuming that the position specifying device 1a is near the device 111, the transmitter 63 reads the device state information item from the storage unit 62, obtains the individual information item from the identification tag 111a and transmits the device state information item to the position specifying device 1a (step S34). The transmitter 63 determines that the individual information item has been read from the identification tag 111a (Yes to step S33) when, for example, the transmitter 63 or a sensor that is not illustrated has detected radio waves emitted from the position specifying device 1a; however, the determination is not limited to this method. While the device 111 has been described as an example, the other devices operate similarly.

Figure 14:
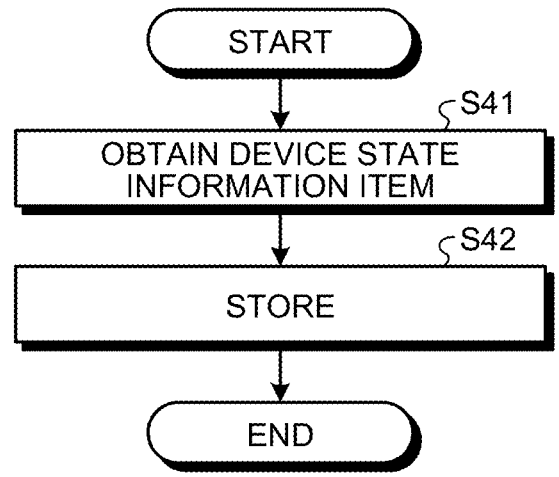
FIG. 14 is a flowchart illustrating how the position specifying device according to the fourth embodiment operates when obtaining the device state information item.

As with the position specifying device 1 according to the first embodiment, the position specifying device 1a obtains the individual information item from each device. This is when the device state information item should be obtained only once from each device. FIG. 14 is a flowchart illustrating how the position specifying device 1a according to the fourth embodiment operates when obtaining the device state information item. When the device state information acquisition unit 7 of the position specifying device 1a has obtained the device state information item from the device (step S41), the device state information acquisition unit 7 stores the device state information item (step S42).

The position specifying device 1a stores the obtained device state information item along with the individual information item in the server, which is not illustrated. The position specifying device 1a may pass the obtained device state information item to the server via communication or a storage medium. Thus when there is a failed device, a user is enabled to ascertain what kind of train composition has used the failed device by searching the server for the individual information item of the failed device. Moreover, use of the device state information item of the failed device enables the user to ascertain changes in the device's operation that have led up to the failure. The position specifying device 1a may obtain the device state information item along with the individual information item of the device.

As described above, the position specifying device 1a according to the present embodiment obtains the device state information item from each device. This enables the position specifying device 1a to store the device state information item in association with a use state of the device.

The above configurations illustrated in the embodiments are illustrative of contents of the present invention, can be combined with other techniques that are publicly known and can be partly omitted or changed without departing from the gist of the present invention.

REFERENCE SIGNS LIST 1, 1a position specifying device; 2 read target reception unit; 3 design information acquisition unit; 4 model number information acquisition unit; 5 reader; 6 determination unit; 7 device state information acquisition unit; 10, 20 train; 11 to 13, 21 to 23 vehicle; 111 to 115, 121 to 122, 131 to 135, 211 to 215, 221 to 222, 231 to 235 device; 111a to 115a, 121a to 122a, 131a to 135a, 211a to 215a, 221a to 222a, 231a to 235a identification tag; 50 position specifying system; 61 sensor; 62 storage unit; transmitter.

The invention claimed is:

1. A position specifying device comprising:
an input interface to receive an indicated read range for an identification tag to be read, the identification tag being affixed to one of a plurality of devices installed in vehicles of a train and storing an individual information item identifying the one device;
a radio frequency identification reader to read, from each of one or more identification tags, the individual information item stored in the identification tag; and
processing circuitry configured to:
obtain at least one design information item indicating a model number of the one of the plurality of the devices within the indicated read range and an installation position of the one of the plurality of the devices with the model number in the vehicles of the train, the model number indicating a type of each of the devices;
obtain at least one model number information item indicating a relationship between the model number and the individual information item;
ascertain, by use of the model number information item(s), the model number of at least one of the plurality of the devices having the individual information item read by the radio frequency identification reader,
determine, by use of the design information item(s), whether or not the at least one of the plurality of the devices having the model number ascertained is present in the indicated read range of the input interface, and
associate an installation position indicated by the design information item with the individual information item of the at least one of the plurality of devices having the model number ascertained when the at least one of the plurality of the devices having the model number ascertained is present in the indicated read range.

2. The position specifying device according to claim 1, wherein
the processing circuitry notifies a user when individual information items are read from a plurality of devices having identical model numbers.

3. The position specifying device according to claim 1, wherein
the input interface receives, for a plurality of trains, an indicated read range for the identification tag(s), and
for each of the plurality of the trains, the processing circuitry:
ascertains, by use of the model number information item(s), a model number of at least one of the plurality of the devices having the individual information item read by the radio frequency identification reader,
determines, by use of the design information item(s), whether or not the at least one of the plurality of the devices having the model number ascertained is present in the indicated read range of the input interface, and
associates an installation position indicated by the design information item with the individual information item of the at least one of the plurality of the devices having a model number ascertained when the at least one of the plurality of the devices having the model number ascertained is present in the indicated read range.

4. The position specifying device according to claim 1, wherein
the processing circuitry obtains, from any of the plurality of the devices, a device state information item indicating an operating state of one of the plurality of the devices.

5. A position specifying system comprising:
the position specifying device according to claim 4;
identification tags each of which is affixed to one of the plurality of the devices installed in the vehicles of each train, each of the identification tags storing an individual information item identifying one of the plurality of the devices; and
a transmitting device to transmit, to the position specifying device, the device state information item indicating an operating state of one of the plurality of the devices, the transmitting device being installed in each of the plurality of the devices.

6. A position specifying system comprising:
the position specifying device according to claim 1; and
identification tags each of which is affixed to one of the devices installed in the vehicles of each train, each of the identification tags storing an individual information item identifying one of the plurality of the devices.

7. A position specifying method of a position specifying device, the position specifying method comprising:
receiving an indicated read range for an identification tag to be read, the identification tag being affixed to one of a plurality of devices installed in vehicles of a train and storing an individual information item identifying the one device;
obtaining at least one design information item indicating a model number of one of the plurality of the devices within the indicated read range and an installation position of the one of the plurality of the devices with the model number in the vehicles of the train, the model number indicating a type of each of the devices;
obtaining at least one model number information item indicating a relationship between the model number and the individual information item;
reading, from each of one or more identification tags, an individual information item of one of the plurality of the devices stored in the identification tag;
ascertaining, by use of the model number information item(s), a model number of at least one of the plurality of the devices having an individual information item read;
determining, by use of the design information item(s), whether or not the at least one of the plurality of the devices having the model number ascertained is present in the indicated read range; and
associating an installation position indicated by the design information item with the individual information item of the at least one of the plurality of the devices having the model number ascertained when the at least one of the plurality of the devices having the model number ascertained is present in the indicated read range.

8. The position specifying method according to claim 7, wherein
a notification is issued to a user when individual information items are read from a plurality of devices which have identical model numbers.

9. The position specifying method according to claim 7, wherein
in the receiving the indicated read range, an indicated read range for the identification tag(s) for a plurality of trains is received, and for each of the plurality of the trains, 1) ascertaining, by use of the plurality of the model number information item(s), a model number of at least one of the plurality of the devices having the individual information item read, 2) determining, by use of the plurality of the design information item(s), whether or not the at least one of the plurality of the devices having the model number ascertained is present in the indicated read range, and 3) associating an installation position indicated by the design information item with the individual information item of the at least one of the plurality of the devices having a model number ascertained when the at least one of the plurality of the devices having the model number ascertained is present in the indicated read range.

10. The position specifying method according to claim 7, further comprising obtaining, from any of the plurality of the devices, a device state information item indicating an operating state of one of the plurality of the devices.

11. A non-transitory computer readable storage medium storing a position specifying program to cause a processor to carry out the position specifying method according to claim 7.

\* \* \* \* \*